United States Patent
Tutino et al.

(10) Patent No.: US 11,725,140 B2
(45) Date of Patent: Aug. 15, 2023

(54) PHOTOLUMINESCENT PREMIXED COMPOSITIONS, RELATED METHODS AND USES

(71) Applicant: Alliance Designer Products Inc., Laval (CA)

(72) Inventors: Giacomo Tutino, Laval (CA); Alain Daoust, Blainville (CA)

(73) Assignee: Alliance Designer Products Inc., Laval (CA)

( * ) Notice: Subject to any disclaimer, the term of this patent is extended or adjusted under 35 U.S.C. 154(b) by 0 days.

(21) Appl. No.: 17/670,870

(22) Filed: Feb. 14, 2022

(65) Prior Publication Data

US 2022/0162122 A1    May 26, 2022

Related U.S. Application Data

(63) Continuation of application No. 16/534,564, filed on Aug. 7, 2019, now Pat. No. 11,279,654.

(51) Int. Cl.

| | | |
|---|---|---|
| *C09K 11/77* | (2006.01) | |
| *C04B 18/02* | (2006.01) | |
| *C09K 11/58* | (2006.01) | |
| *C04B 28/24* | (2006.01) | |
| *C04B 26/04* | (2006.01) | |
| *C04B 26/18* | (2006.01) | |
| *C04B 40/00* | (2006.01) | |
| *C04B 26/20* | (2006.01) | |
| *E01C 5/00* | (2006.01) | |
| *C09K 11/02* | (2006.01) | |
| *C04B 111/00* | (2006.01) | |
| *C04B 103/54* | (2006.01) | |
| *C04B 111/80* | (2006.01) | |

(52) U.S. Cl.
CPC ........ *C09K 11/7734* (2013.01); *C04B 18/021* (2013.01); *C04B 18/022* (2013.01); *C04B 26/045* (2013.01); *C04B 26/18* (2013.01); *C04B 26/20* (2013.01); *C04B 28/24* (2013.01); *C04B 40/0042* (2013.01); *C09K 11/02* (2013.01); *C09K 11/025* (2013.01); *C09K 11/584* (2013.01); *C09K 11/7706* (2013.01); *E01C 5/003* (2013.01); *C04B 2103/54* (2013.01); *C04B 2111/00681* (2013.01); *C04B 2111/807* (2013.01)

(58) Field of Classification Search
CPC ..... C09K 11/02; C09K 11/7734; E01C 5/003; C04B 18/032; C04B 18/12; C04B 18/22; C04B 18/20; C04B 18/167; C04B 18/16; C04B 2111/807; C04B 2111/00689; C04B 2111/00672; C04B 26/28; C04B 26/22; C04B 26/20; C04B 40/0042
See application file for complete search history.

(56) References Cited

U.S. PATENT DOCUMENTS

| | | | | |
|---|---|---|---|---|
| 5,686,180 A | * | 11/1997 | Rivlin | ........................ C09J 7/29 428/350 |
| 11,299,423 B1 | * | 4/2022 | Ketty | ..................... C09K 11/59 |
| 2005/0160637 A1 | * | 7/2005 | Hesse | ................... E04H 13/003 40/124.5 |

OTHER PUBLICATIONS

Snadlock Architectural Product Specification, 2005.*

* cited by examiner

*Primary Examiner* — C Melissa Koslow
(74) *Attorney, Agent, or Firm* — Evan Law Group LLC (57) ABSTRACT

A premixed photoluminescent composition and related hardened form and method of forming joints for pavers or stones. The premixed photoluminescent composition comprises solid aggregates; a photoluminescent particulate component adapted to emit light when photoexcited; and a binder. When in contact with an activator, oxygen or water, the binder is adapted to harden into a water-resistant binder matrix that bonds the solid aggregates and embeds the photoluminescent particulate component. In use, the water-resistant binder matrix has a transparency allowing transmission of at least a portion of the light emitted by the photoluminescent particulate component.

21 Claims, 2 Drawing Sheets

PHOTOLUMINESCENT PREMIXED COMPOSITIONS, RELATED METHODS AND USES

TECHNICAL FIELD

The present invention generally relates to photoluminescent building materials, and more particularly to a premixed photoluminescent composition forming, upon being in presence of an activator, a water-resistant hardened photoluminescent composition that can be used as a joints for pavers or stones.

BACKGROUND

Photoluminescent components are known as an alternative to electric lighting and can be used in the field of building materials and safety signs to provide visual-aid and aesthetical effects.

In the field of building materials, photoluminescent components are generally used in combination with cementitious compositions having an alkaline pH which could be favorable to some photoluminescent components. For example, typical existing photoluminescent grout's products are made of Portland or Aluminate cement, sand, cellulose and redispersible polymer powders (VAE, Acrylic, SBR, Versatate, Methacrylic copolymer). They can also be made of thermosets resins such as 2K Epoxies, 2K Urethane, 1K Urethane, Polyaspartic, Polyester or Methyl Methacrylate Oligomers.

U.S. Pat. No. 6,596,074 discloses the use of rare earth doped calcium aluminates as a phosphorescent pigment incorporated into a cementious matrix. The phosphorescent pigment can be incorporated into the cementious matrix directly or coated on the silica aggregate commonly used as filler in cement-based preparations. The intensity of the luminescence is dependent upon the amount of pigment used. Pigment loads from 1 to 30% of the cementious base have been successful in giving perceivable luminescence even in low light level environments.

US Publication 2017/0334780 discloses a photoluminescent cementitious composition suitable in particular for use in safety signs in accordance with DIN 67510-1 standard, characterized by including a hydraulic binder, an aggregate and at least a photoluminescent pigment selected from strontium aluminates and silicates doped with rare earths selected from europium (Eu) and/or dysprosium (Dy).

International Publication WO 2010/134805 discloses a method comprising the introduction of small light-emitting glass pieces into the product made of concrete or their application to the surface of the product made of concrete, where the small glass pieces contain a light-emitting pigment, and by making the small glass pieces visible on the surface of the concrete, after which the concrete is further processed, smoothed down or otherwise treated, so that a product made of concrete is obtained that has a light-emitting surface, with small glass pieces comprising light-emitting pigments that can emit light in the dark.

Other known moisture-cured liquid compositions for pathways are described in International Publication WO 2014/116752. Polyamine epoxy resin adduct as curing agent in combination with a water repellent component can be used in compositions for grouting as described in U.S. Pat. No. 6,881,768. Liquid coating compositions can be used for coating pavers and are curable upon heating in a kiln as described in U.S. Pat. No. 8,617,638.

While the above prior composition and methods may provide acceptable use of luminescence properties in different contexts, luminescence of the embedded photoluminescent component remains to be improved as known compositions can alter the light emission, require a large amount of the photoluminescent components to obtain a satisfactory luminescence which is adequate for visual-aid, safety and aesthetics or is not adapted for use as paver joints.

SUMMARY

Implementations of the premixed photoluminescent composition described herein provide a water-resistant, aesthetical and practical solution to create joints between pavers or stones. The composition includes a binder having a transparency adapted to benefit from the luminescence of a photoluminescent component embedded in the composition once the binder is hardened after being activated by an activator. The activator is water or oxygen. More particularly, when in contact with water, oxygen or air, the binder hardens into a water-resistant binder matrix, and once, hardened, the water-resistant binder matrix has a transparency allowing transmission of at least a portion of the light emitted by the photoluminescent particulate component.

According to a broad aspect, there is provided a premixed photoluminescent composition, comprising solid aggregates; a photoluminescent particulate component adapted to emit light when photoexcited; and a binder. When in contact with an activator, the binder is adapted to harden into a water-resistant binder matrix that bonds the solid aggregates and embeds the photoluminescent particulate component. In use, the water-resistant binder matrix has a transparency allowing transmission of at least a portion of the light emitted by the photoluminescent particulate component; and the activator is water or oxygen.

In some implementations of the premixed photoluminescent composition, the solid aggregates comprise natural sand, manufactured sand, iron silicate, granite stone, quartz, sillimanite, crystalline silica, recycled glass, crumb rubber, mine tailings, crushed concrete, recycled plastics or a combination thereof.

In some implementations of the premixed photoluminescent composition, the solid aggregates are manufactured masonry sand particles.

In some implementations of the premixed photoluminescent composition, the water-resistant binder matrix is translucent or transparent. In some implementations of the premixed photoluminescent composition, the binder is translucent or transparent.

In some implementations of the premixed photoluminescent composition, the binder is a non-hydraulic binder.

In some implementations of the premixed photoluminescent composition, the binder is a water-activated binder being at least one of a natural or synthetic hydrocolloid, natural vegetal gum, polyacrylamide (PAA), psyllium husk powder, polyvinyl alcohol partially hydrolysed, polymer with ethanol, potassium silicate and metasilicate pentahydrate salt.

In some implementations of the premixed photoluminescent composition, the binder is an oxygen-activated binder being unsaponifiable liquid polybutadiene.

In some implementations of the premixed photoluminescent composition, the binder is an air-activated binder being an alkyd resin.

In some implementations of the premixed photoluminescent composition, the photoluminescent particulate component is made of particles of a powder, granules or glitter.

In some implementations of the premixed photoluminescent composition, the photoluminescent particulate component is copper-activated zinc sulfide, calcium aluminate, calcium sulphite, strontium silicate, oxysulfide, strontium aluminate doped with Europium ions (Eu+2), dysprosium ions (Dy+3), or any combinations thereof.

In some implementations of the premixed photoluminescent composition, the binder is made of particles having a particle size ranging from 75 μm to 9.50 mm.

In some implementations of the premixed photoluminescent composition, the composition contains 0.5 to 30 wt % of the photoluminescent particulate component with respect to a total weight of the premixed photoluminescent composition. Optionally, the composition contains 3 to 10 wt % of the photoluminescent particulate component with respect to the total weight of the premixed photoluminescent composition.

In some implementations of the premixed photoluminescent composition, the composition contains 1 to 10 wt % of the binder with respect to a total weight of the premixed photoluminescent composition. Optionally, the composition contains 2 to 5 wt % of the binder with respect to the total weight of the premixed photoluminescent composition.

In some implementations of the premixed photoluminescent composition, a weight ratio of the photoluminescent particulate component over the binder is between 0.05/1 and 30/1.

In some implementations of the premixed photoluminescent composition, a weight ratio of the binder over the aggregates is between 0.01/1 to 0.17/1.

In some implementations of the premixed photoluminescent composition, the premixed composition further comprises one or more additives being at least one of an anti-leaching agent, a hydrophilic agent, a pH-control agent, a water-resistance agent, and a dust control agent. Optionally, the premixed composition comprises at most 2 wt % of the additives with respect to the total weight of the premixed photoluminescent composition.

In some implementations of the premixed photoluminescent composition, the photoluminescent particulate component is homogeneously distributed among the solid aggregates.

In another aspect, there is provided a hardened photoluminescent composition made by contacting a premixed composition with an activator. The hardened photoluminescent composition comprises a water-resistant binder matrix; a photoluminescent particulate component embedded in the water-resistant binder matrix and adapted to emit light after being photoexcited; and solid aggregates bonded together by the water-resistant binder matrix. In use, the water-resistant binder matrix has a transparency allowing transmission of at least a portion of the light emitted by the photoluminescent particulate component; and the activator is water or oxygen.

In some implementations of the hardened photoluminescent composition, the solid aggregates comprise natural sand, manufactured sand, iron silicate, granite stone, quartz, sillimanite, crystalline silica, recycled glass, crumb rubber, mine tailings, crushed concrete, recycled plastic or a combination thereof.

In some implementations of the hardened photoluminescent composition, the solid aggregates are manufactured masonry sand particles.

In some implementations of the hardened photoluminescent composition, the water-resistant binder matrix is translucent.

In some implementations of the hardened photoluminescent composition, the water-resistant binder matrix is transparent.

In some implementations of the hardened photoluminescent composition, the binder is a non-hydraulic binder.

In some implementations of the hardened photoluminescent composition, the water-resistant binder matrix results from crystallisation and/or film formation of a water-activated binder being at least one of a natural or synthetic hydrocolloid, natural vegetal gum, polyacrylamide (PAA), psyllium husk powder, polyvinyl alcohol partially hydrolysed, polymer with ethanol, potassium silicate and metasilicate pentahydrate salt.

In some implementations of the hardened photoluminescent composition, the water-resistant binder matrix results from the cross-linking of an oxygen-activated binder being unsaponifiable liquid polybutadiene.

In some implementations of the hardened photoluminescent composition, the water-resistant binder matrix results from oxidation of an air-activated binder being an alkyd resin.

In some implementations of the hardened photoluminescent composition, the photoluminescent particulate component is made of particles of a powder, granules or glitters.

In some implementations of the hardened photoluminescent composition, the photoluminescent particulate component is copper-activated zinc sulfide, calcium aluminate, calcium sulphite, strontium silicate, oxysulfide, strontium aluminate doped with Europium ions (Eu+2), dysprosium ions (Dy+3), or any combinations thereof.

In some implementations of the hardened photoluminescent composition, the hardened composition contains 0.5 to 30 wt % of the photoluminescent particulate component with respect to a total weight of the hardened photoluminescent composition. Optionally, the hardened composition contains 3 to 10 wt % of the photoluminescent particulate component with respect to the total weight of the hardened photoluminescent composition.

In some implementations of the hardened photoluminescent composition, the hardened composition contains 1 to 10 wt % of the binder matrix with respect to a total weight of the hardened photoluminescent composition. Optionally, the hardened composition contains 2 to 5 wt % of the binder matrix with respect to the total weight of the hardened photoluminescent composition.

In some implementations of the hardened photoluminescent composition, a weight ratio of the photoluminescent particulate component over the binder matrix is between 0.05/1 and 30/1.

In some implementations of the hardened photoluminescent composition, a weight ratio of the binder matrix over the aggregates is between 0.01/1 and 0.17/1.

In some implementations of the hardened photoluminescent composition, the hardened composition further comprises one or more additives being at least one of an anti-leaching agent, a hydrophilic agent, a pH-control agent, an anti-dust agent and a water-resistance agent. Optionally, the hardened photoluminescent composition contains at most 2 wt % of the additives with respect to the total weight of the hardened photoluminescent composition.

In some implementations of the hardened photoluminescent composition, the photoluminescent particulate component is homogeneously distributed within the binder matrix.

In another aspect, there is provided a method of making a hardened composition for forming a photoluminescent joint between pavers, the method comprising:
providing the pavers spaced-apart from one another so as to leave a space therebetween;
filling the space with a premixed photoluminescent composition as defined herein;

compacting the premixed photoluminescent composition to produce a compacted composition; and contacting the compacted composition with an activator to activate conversion of the binder into a water-resistant binder matrix.

In some implementations of the method, filing the space can comprise sweeping or pushing the premixed composition into the space.

In another aspect, there is provided a use of a premixed photoluminescent composition as defined herein for making a photoluminescent joint between pavers or stones.

In another aspect, there is provided a use of a hardened photoluminescent composition as defined herein as a photoluminescent joint between pavers or stones.

Implementations of the premixed photoluminescent composition and related composition are represented below and will be further understood in connection with the following figures.

BRIEF DESCRIPTION OF THE DRAWINGS

Implementations of the premixed photoluminescent composition and related composition are represented below and will be further understood in connection with the following figures.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

DETAILED DESCRIPTION OF EMBODIMENTS

Examples, variants and preferred embodiments of the invention are described hereinbelow. In one broad aspect, there is provided a premixed photoluminescent composition to be contacted with an activator to activate hardening of the composition into a hardened composition. The premix photoluminescent composition may be used to form joints between pavers or stones.

It is worth mentioning that throughout the following description when the article "a" is used to introduce an element it does not have the meaning of "only one" it rather means of "one or more". For instance, the unit according to the invention can be provided with one or more reaction and/or separation chamber, one or more confining openwork structure, etc. without departing from the scope of the present invention. It is to be understood that where the specification states that a component, feature, structure, or characteristic "may", "might", "can" or "could" be included, that particular component, feature, structure, or characteristic is not required to be included.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Moreover, it is to be understood that the invention is not limited in its application to the details of construction and the arrangement of components set forth in the following description or illustrated in the drawings. The invention is capable of other variants or embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional suitable items.

The compositions described herein can be used in combination with pavers or stones to form joints therebetween. It should be noted that pavers refer herein to wet cast, dry cast or false joints pavers that can be made of concrete or any other suitable material. It should further be noted that stones refer herein to any natural stone or artificial material that can be considered to imitate stone.

The premixed photoluminescent composition encompassed herein includes solid aggregates representing the majority of the weight of the composition. The premixed photoluminescent composition further includes a photoluminescent component, provided as powder particles, granules or glitters mixed with the aggregates, to provide photoluminescent properties to such composition once hardened. The premixed photoluminescent composition further includes an activable binder which can be provided as dry particles dispersed among the aggregates and the photoluminescent component particles, or as a paste embedding the among the aggregates and the photoluminescent component particles. The binder is activable by an activator to result in hardening of the binder. "Activable" or "activation" refers herein to any chemical reaction or physical change that lead to hardening of the binder into a water-resistant matrix upon contacting the binder with an activator. The activator includes water, oxygen and air. The binder is therefore said to be "water-activated", "oxygen-activated" or "air-activated" because the binder, upon being in contact with water, oxygen or air, will form a hardened matrix that is water-resistant and that binds the aggregates and photoluminescent component particles together.

Water-resistance refers herein to a material that will not be dissolved or destroyed upon normal exposure to water deriving from rain, morning dew, snow, freeze-thaw cycles, swimming pool, sprinklers, garden hose etc. These water exposure conditions can be referred to "normal exterior conditions" and water-resistance can also be considered in this context as being "weather resistant". It is understood that the binder is selected among suitable binders such that the binder has enough transparency to allow transmission of at least a portion of the light emitted by the photoluminescent component embedded in the hardened composition.

As used herein, the expression "dry premixed composition" or "dry premixed photoluminescent composition" refers to the combination of dry particulate components, i.e. having at most about 0.5% of residual humidity. The dry particulate components can be homogenously distributed within the premixed composition. The expression "paste premixed composition" or "paste premixed photoluminescent composition" refers to the combination of particulate components embedded in a viscous liquid resin or paste. The expression "activated composition" refers to the dry or paste premixed composition after being contacted with the activator (water, oxygen or air) and in curing phase, but not being hardened yet. The expression "hardened composition" refers to a set composition resulting from the curing of the premixed composition once wetted or exposed to oxygen or air (depending on the binder included in the composition).

The aggregates included in the premixed photoluminescent composition encompassed herein are typical construction aggregates having coarse to medium grained particulate material. Finer aggregates can be used in the premixed composition but due to their smaller size, they can reduce the transparency of the binder once mixed and embedded in such binder. Particle size distribution of the aggregates can therefore be controlled in accordance to a desired transparency for the hardened composition. In some implementations, the aggregates are at least one of the following materials: natural sand ($SiO_2$), manufactured sand ($SiO_2$), iron silicate, granite stone, quartz, sillimanite, crystalline silica, recycled glass, crumb rubber, mine tailings, crushed concrete, and recycled plastics. Transparency of the hardened composition to the light emitted by the photoluminescent component particles can be optimized by selecting aggregates among suitable aggregates having some transparency or even being transparent, such as recycled glass.

In order to enhance the brightness of the luminescence, it has been found that a suitable particle size distribution can be used for the aggregates. Optionally, the aggregates of the premixed photoluminescent composition are particles having a particle size between 300 μm and 9.00 mm (corresponding to size standard ASTM C-33 #9), and further optionally between 75 μm and 4.75 mm (corresponding to standard ASTM C-144).

As mentioned, the photoluminescence of the premixed composition is conferred by the presence of a photoluminescent component in particulate form (particles of a powder, granules or glitter) within the premixed composition. Powder is to be understood as a particle having a size between 2 to 100 microns. Granules are to be understood as particles having a size between 100 and 200 microns. Glitter is to be understood as particles of a photoluminescent powder which are fixed to a base of polyester with epoxy glue. The glitter form can, in some cases, avoid or reduce abrasion of the photoluminescent particles by the aggregates within the dry premixed composition. Glitter form can also be recommended in combination with a paste binder since glitters can have a tendency to migrate on the surface of the joints and float during water activation of a water-activatable dry premix composition.

As used herein, photoluminescence refers to the emission of light following the absorption of photons. Photoluminescence is initiated by the excitation of electrons to a higher energy level in an atom upon exposure to photons from a light source, and referred to as photoexcitation. Following such photoexcitation, a relaxation process of the electrons occurs in which photons are re-radiated, thereby conferring photoluminescence to the matter under relaxation. Photoluminescence encompasses phosphorescence resulting from of triplet-singlet electronic relaxation. The photoluminescent component/composition described herein could therefore be qualified as phosphorescent or glow-in-the-dark. Photoluminescence can be herein characterized by a luminescence capacity expressed in seconds, minutes or hours during which the photons are re-radiated upon electronic relaxation of the photoluminescent component after photoexcitation. Photoexcitation of the photoluminescent component is performed by exposition to a light source and depends on the nature of said component. For example, the time required to complete photoexcitation of the photoluminescent component via exposure to natural light or artificial light may be about 10 to about 15 minutes to obtain a luminescence capacity of the hardened composition from about 8 to about 12 hours in absence of a light source.

In some implementations, the photoluminescent component is copper-activated zinc sulfide, calcium aluminate, calcium sulphites, strontium silicate, oxysulfide, strontium aluminate doped with europium ions (Eu+2), dysprosium ions (Dy+3), or any combinations thereof.

The wavelength of the emitted light can also vary according to the nature of the selected photoluminescent component such that different colors can be emitted. It should be noted that, due to the color emitted by the photoluminescent component, such component can be referred herein to a photoluminescent pigment. However, such "pigment" does not provide any color to the joints between stones or pavers under natural or artificial light. Under a light source, the hardened composition has the color conferred by the aggregates which can be for example, but not limited to, variations of grey, beige, black, or white. The color of the pigment is only revealed in absence of such light source when the hardened composition emits colored light, advantageously providing an aesthetical effect and a visual aid to someone in need of guidance.

Colors emitted by the photoluminescent component include green, blue, aqua, orange, red, yellow, purple and white. For example, the wavelength of the emitted light changes with the number of oxygen atoms included in strontium aluminate as it directly affects the internal crystal structure of the final material (Blue: 400 nm: $SrAl_2O_{19}$:Eu, Dv; Aqua: 480 nm: $SrAl_2O_7$:Eu. Dy; Green: 520 nm: $SrAl_2O_4$:Eu, Dv). Intensity of the luminescence can be controlled by varying the amount of photoluminescent component within the dry premixed composition.

Figure 1:
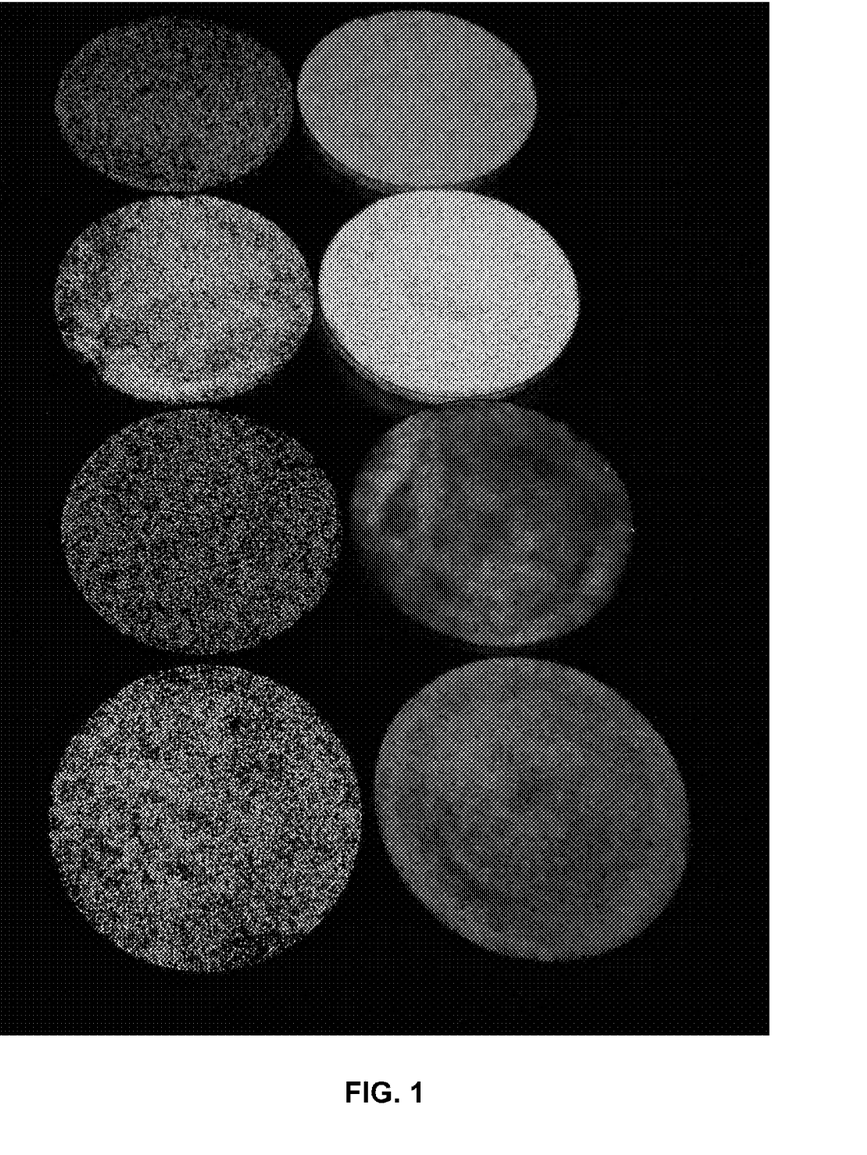
FIG. 1 is a photograph of two rows of several samples of a water-resistant hardened photoluminescent composition in petri dish being prepared upon activation of corresponding samples of premixed photoluminescent composition, and being luminescent after a period of photoexcitation, according to an embodiment of the present invention.

FIG. 1 illustrates hardened composition samples prepared in petri dish and including 5 wt % of different photoluminescent particulate components. The second row of hardened composition samples to the right displays the colors aqua, green, orange and white from top to bottom. Differences in luminescence and distribution of the hardened composition can be explained by the varying quality grade of the photoluminescent particulate components used for the experiment.

In some implementations, the premixed composition may include two photoluminescent components of different nature to create color effects or to optimize the luminescence of the hardened composition. For example, a first luminescent component having a short-term luminescence capacity could be used to glow in a first period of the night in combination with a second luminescent component having a higher luminescence capacity enabling the hardened composition to glow further in the night at a reduced luminescence.

In some implementations, the photoluminescent component may not be homogeneously distributed among aggregates of the premixed composition so as to form clusters or lumps of luminescence once the composition is hardened.

In some implementations, the content of the photoluminescent component in the premixed photoluminescent composition varies from about 0.5 to about 30 wt %, optionally from about 3 to about 10 wt %, with respect to a total weight of the premixed photoluminescent composition.

The premixed photoluminescent composition further includes the binder which can be provided as a particulate material dispersed among the aggregates and the photoluminescent component particles (dry premixed composition). The binder can also be provided as a paste embedding the aggregates and the photoluminescent component particles (paste premixed composition). As mentioned above, the binder is said to be "water-activated", "oxygen-activated" or "air-activated" because the binder, upon being in contact with water, oxygen or air will form a hardened matrix which is water-resistant and binds the aggregates and photoluminescent component particles together.

The binder is selected among suitable binders that have enough transparency to allow transmission of at least a portion of the light emitted by the photoluminescent component embedded in the hardened composition. It should be noted that transparency of the binder is to be understood as a capacity to let the luminescence of the encapsulated photoluminescent component being seen through the water-resistant binder matrix, resulting from the hardening of the water-activated, oxygen-activated or air-activated binder after having been contacted with the activator (e.g. water, oxygen or air).

For example, the binder used in the premixed composition can already be transparent, or can become transparent upon being solubilized in water, or contacted with oxygen or air. The binder remains transparent upon hardening to form the water-resistant binder matrix of the hardened composition. Alternatively, the binder particulate material may not be transparent and can gain transparency upon being solubilized in water, or contacted with oxygen or air, and hardening to form the water-resistant binder matrix of the hardened composition. Transparency of the binder can be for example characterized by a percentage of transmission of the amount of light (at a given wavelength or within a wavelength range) emitted by the photoluminescent component which is transmitted through the water-resistant matrix of the hardened binder such that the photoluminescent component is seen to some extent behind this matrix. Transparency of the binder can be also be characterized by a percentage of transmission of the amount of light through the matrix of the hardened binder and absorbable by the photoluminescent component, such that the photoluminescent component can be photoexcited upon exposure of the composition to a light source.

As used herein, the term "transparent" (or "clear") characterizes a substance able to provide an average transmission of a straight through beam of at least about 50% across the visible light wavelength range. As used herein, the term "translucent" characterizes a substance able to provide an average transmission of a straight through beam of at least about 40% across the visible light wavelength range. For example, luminescence of the hardened composition in absence of light can be measured by a Hagner™ photometer ERP-105 according to the method DIN 67510-1 (Range: 0.01-20 000 mcd/m$^2$). The amount of light needed to activate the luminescence of the hardened composition can be measured using a Hagner™ digital luxmeter E4-X (Range: 0.01 to 200 000 Lux).

In some implementations, the binder of the premixed composition is selected among suitable binders to form a translucent matrix after being contacted with the activator to produce the hardened composition. In other implementations, the binder of the premixed composition is selected among suitable binders to form a transparent matrix after being contacted with the activator to produce the hardened composition.

It should be noted that a water-activated binder as used herein is different from a hydraulic binder (such as cement, lime, fly ash, slag or blast furnace) which would not provide a suitable transparency to the hardened composition.

In some implementations, the binder can pertain to two categories:

a. Organic polymers:
   water-activated binder such as natural or synthetics hydrocolloids such as modified polysaccharide powder and chemical modified carbohydrate starch ether; natural vegetal gum such as guar or xanthan gum; polyacrylamide (PAA) such as 2-propenamide homopolymer; psyllium husk powder such as tritriacontatonoic acid; polyvinyl alcohol partially hydrolysed such as acetic acid ethynyl ester; and polymer with ethanol. These organic polymer binders are water soluble and will form a film by water evaporation. This film can crosslink upon certain conditions and became water resistant;
   oxygen-activated binder such as unsaponifiable liquid polybutadiene which is an oligomer that will react with atmospheric oxygen to form peroxide and undergo crosslinking in its presence in order to form a water-resistant polymer; and
   air-activated binder such as alkyd resins that will react with atmospheric air. In this process, the solvent evaporates and a closed film forms through coalescence of the binder particles. Then chemical drying (also called oxidative drying) occurs, as a lipid autoxidation process, which means that the resins dries by oxidation of the binder compound with molecular oxygen from the air.

b. Inorganic or mineral binders:
   water-activated binder: potassium silicate such as silicic acid potassium salt; and metasilicate pentahydrate salt such as anhydrous disodium trioxosilicate. These inorganic binders are water soluble and will crystallise by water evaporation.

The activator encompassed herein can be water or oxygen such that the binder is selected among suitable water-activated, oxygen-activated or air-activated binders. "Water-activated" can be understood as water-cured and results from film formation of the binder. The mechanism by which films are formed is dependent on whether the binder, such as a polymer, is in dissolved or dispersed state. For polymers dissolved in solutions, film formation occurs as the solvent evaporates, since the polymer chains are intimately mixed. Film formation from polymeric dispersions requires coalescence of individual polymer spheres and interpenetration of the polymer chains. Finally, film formation by crystallization of polymers is a process associated with partial alignment of their molecular chains. Water-cured can be distinguished from moisture-cured. Moisture-cured binders such as (1K) urethane have disadvantages for applications such as joints because they are applied as a thin layer, such as a coating, where the surface will react with humidity of the air and become set. However, such liquid and thin layer can stain the pavers when forming joints. "Air-activated" or "oxygen-activated" refers to the curing under the action of oxygen which results from oxidation when oxygen from the air reacts with unsaturated fatty acids in their drying oils. By this reaction, liquid resins are converted to solid films. Unsaponifiable liquid polybutadiene, which is an oligomer being an oxygen-activated binder, reacts with atmospheric oxygen to form peroxide and undergo crosslinking in its presence in order to form a water-resistant polymer matrix.

In some implementations, the content of the binder in the premixed composition varies from about 1 to about 10 wt %, optionally about 2 to about 5 wt %, with respect to the total weight of the dry premixed photoluminescent composition.

In some implementations, the premixed composition, when activated by water, can become a set composition within 1 hour after activation at above 32° F. (0° C.) and is rain safe within 15 minutes after water activation.

In some implementations, the premixed photoluminescent composition includes at least one additive which can be an anti-leaching agent, a hydrophilic agent, a pH-control agent, a dust control agent or a water-resistance agent (crosslinker). Combinations of such additives may further be included in the premixed composition in accordance to the properties to be given to the final hardened composition. The premixed composition can have an additive content of at most about 2 wt % with respect to the total weight of the premixed photoluminescent composition.

For example, the photoluminescent component can be water-based photoluminescent strontium aluminate powder that has a pH between 7 and 8 (neutral). Such component can usually be used in weak alkaline environment of pH 8-10 without being affected. If final pH of the hardened composition is superior to 10, some measures can be taken to make sure that the photoluminescent component will not be affected. Indeed, strontium aluminate can have a reduced luminescence when pH exceeds 10. A pH-control agent may therefore be added to the premixed composition to reduce the pH of the composition under 10. It should be also noted that regular luminescent powder can not be used directly in aqueous solvent since this powder is not waterproof. Optionally, the photoluminescent powder can be silicon-coated photoluminescent powder. The silicone-coated photoluminescent powder has a suitable thermal stability, chemical resistance and weather resistance for joint application.

In another example, a combination of a pH-control agent and a water-resistance agent can be added as components of the premixed composition. In another example, a combination of an anti-leaching agent and a hydrophilic agent can be added as components of the dry premixed composition. Optionally, a pH control agent, an anti-leaching agent, a water resistance agent, a hydrophilic agent, a dust control agent can be included in the premixed composition to provide optimal performance.

There is further provided a method to prepare the premixed photoluminescent composition including successively adding the aggregates, the binder and the photoluminescent component particles in a mixing unit while mixing for a mixing time between about 2 and about 10 minutes until production of a homogeneous composition.

There is further provided a method for forming photoluminescent joints around pavers which includes providing the pavers spaced-apart from one another so as to leave a cavity therebetween; filling the cavity with the premixed photoluminescent composition described herein, compacting the premixed photoluminescent composition; and optionally repeating the filling-compacting steps if needed. Then the method includes activating the binder to form the hardened composition into durable joints. Depending on the type of binder includes in the premixed composition, the method can include distinct activation steps. If the premixed composition includes a water-activated binder, the method can include dispersing water into and/or onto the compacted composition for hardening thereof into joints. If the premixed composition includes a oxygen or air-activated binder, the method can include exposing the compacted composition to air or oxygen to form the hardened composition by curing.

Figure 2:
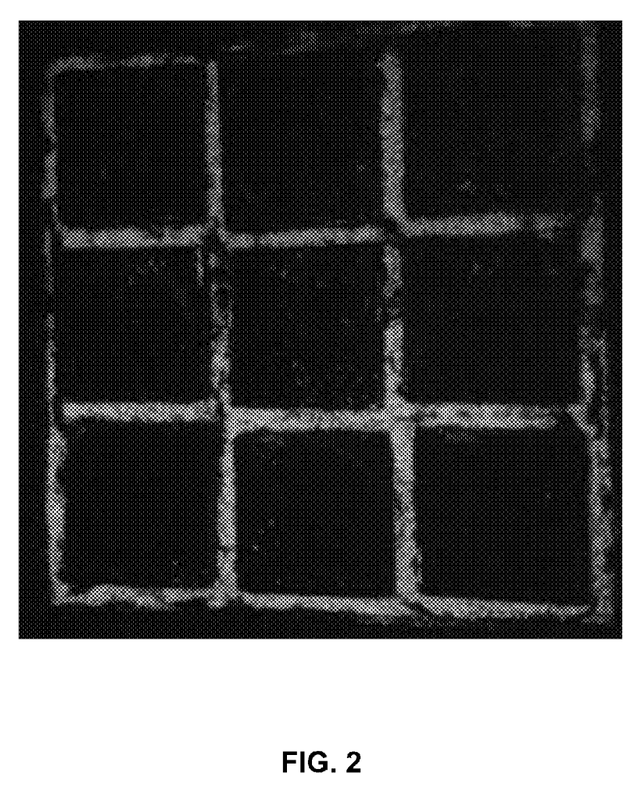
FIG. 2 is a photograph of several dry cast pavers jointed with a water-resistant hardened photoluminescent composition being prepared upon activation of a premixed photoluminescent composition, and being luminescent after a period of photoexcitation, according to an embodiment of the present invention.

It should be noted that sweeping the excess of premixed composition before compacting may be performed with a broom (for dry composition) or squeegee (for paste composition). The method may further include leaving the activated composition at least one hour after activation at above about 32° F. (0° C.). FIG. 2 illustrates a photoluminescent paver joints applied according to said method and in absence of light source after photoexcitation. One can easily see the luminescence of the joints, thereby illuminating the pavement.

EXAMPLES

Several premixed photoluminescent compositions according to the implementations described herein were prepared by mixing components into a horizontal ribbon type mixer or vertical planetary mixer. Components of the compositions are provided by sequential number in the following examples in accordance with their order of addition into the mixer to form the dry premixed composition. The order of addition can influence final properties of the matrix system since some raw material need more mixing time or also need to be in presence of another ingredients in order to react with these ingredients.

For all examples provided below, mixing time varied from about 2 to about 10 minutes and each component of the composition had no more than about 0.5% residual humidity. Mixing time can depend of the efficiency of the mixer (type of blades, baffles, shape of the mixer, agitation speed, size of the batches, order of addition and feeding orifices positions). An optimal mixing time can be determined when no change in the final properties of the premixed composition is observed. Final properties include light emission, setting time, hardness, and water resistance.

Example 1

1. Aggregate: Manufactured masonry dry sand with grading compliant to ASTM C-144-86.5 wt %
2. Binder. *Psyllium* Husk Powder (Hydrocolloid)—2.5 wt %
3. Anti-leaching agent: Dolomitic hydrated lime—0.5 wt %
4. Hydrophilic agent: Light Soda Ash anhydrous—0.5 wt %
5. Photoluminescent component particles: Honeywell Lumilux® Green N (Zinc Sulfide with copper)—10 wt %

Example 2

1. Aggregates: Manufactured masonry dry sand with grading compliant to ASTM C-144-89.5 wt %
2. Binder 1: Kuraray Poval® 5-88 (Partially hydrolysed Polyvinyl alcohol): 5.0 wt %
3. Binder 2: PQ Corp. Metso Beads® 2048 (Metasilicate pentahydrate salt): 0.5 wt %
4. Photoluminescent component particles: Honeywell Lumilux® Green SN-F25 (Doped Strontium Aluminate)—5 wt %

Example 3

1. Aggregates: Manufactured masonry dry sand with grading compliant to ASTM C-144-88.0 wt %
2. Binder: SNF Flopam® AN-923-VHM (Anionic Polyacrylamide)—3.5 wt %
3. pH control agent: Sodium aluminate (Alkali)—0.5 wt %
4. Water-resistance agent: Sodium Oleate—0.5 wt %
5. Photoluminescent component particles: Honeywell Lumilux® Green SN-F25 (Doped Strontium Aluminate)—7.5 wt %

It should be understood that any one of the above-mentioned aspects of each components, method and use of the premixed photoluminescent composition may be combined with any other of the aspects thereof, unless two aspects clearly cannot be combined due to their mutually exclusivity.

The above description of the variants, examples or embodiments should not be interpreted in a limiting manner since other variations, modifications and refinements are possible within the scope of the present invention. Accordingly, it should be understood that various features and aspects of the disclosed variants or embodiments can be combined with or substituted for one another in order to form varying modes of the disclosed invention. For example, and without limitation, any individual element(s) of the described variants or embodiments may be replaced by alternative elements that provide substantially similar functionality or otherwise provide adequate operation. This includes, for example, presently known alternative elements, such as those that might be currently known to a skilled person in the art, and alternative elements that may be developed in the future, such as those that a skilled person in the art might, upon development, recognize as an alternative. Further, the disclosed variants or embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a", "an", or "the", is not to be construed as limiting the element to the singular. Any reference to claim elements as "at least one of X, Y and Z" is meant to include any one of X, Y or Z individually, and any combination of X, Y and Z, including, X, Y, Z; X, Y; X, Z; and Y, Z. The scope of the invention is defined in the appended claims and their equivalents.

The invention claimed is:

1. A method of making a hardened water-resistant photoluminescent composition, the method comprising:
   providing a dry premixed photoluminescent composition, the premixed photoluminescent composition comprising solid aggregates, a photoluminescent particulate component adapted to emit light when photoexcited, and a water-activated binder; and
   contacting the dry premixed photoluminescent composition with water to activate conversion of the water-activated binder, via diffusion of water, into a water-resistant binder matrix having a transparency allowing transmission of at least a portion of the light emitted by the photoluminescent particulate component, thereby forming the hardened water-resistant photoluminescent composition;
   wherein the binder is made of particles having a particle size ranging from 75 µm to 9.50 mm.

2. The method of claim 1, further comprising compacting the dry premixed photoluminescent composition into a compacted composition, prior to contacting with water.

3. The method of claim 1, wherein the solid aggregates have a particle size ranging from 75 µm to 9.50 mm.

4. The method of claim 1, wherein the solid aggregates comprise natural sand, manufactured sand, iron silicate, granite stone, quartz, sillimanite, crystalline silica, recycled glass, crumb rubber, mine tailings, crushed concrete, recycled plastics or a combination thereof.

5. The method of claim 1, wherein the binder is translucent or transparent.

6. The method of claim 1, wherein the binder is a water-activated binder being at least one of a natural or synthetic hydrocolloid, natural vegetal gum, polyacrylamide, psyllium husk powder, and polyvinyl alcohol partially hydrolysed.

7. The method of claim 1, wherein the photoluminescent particulate component is made of particles of a powder, granules or glitter.

8. The method of claim 1, wherein the photoluminescent particulate component is copper-activated zinc sulfide, calcium aluminate, calcium sulphite, strontium silicate, oxysulfide, strontium aluminate doped with at least one of Europium ions and dysprosium ions, or any combinations thereof.

9. The method of claim 1, wherein the premixed photoluminescent composition contains 0.5 to 30 wt % of the photoluminescent particulate component with respect to a total weight of the premixed photoluminescent composition.

10. The method of claim 1, wherein the premixed photoluminescent composition contains 1 to 10 wt % of the binder with respect to a total weight of the premixed photoluminescent composition.

11. The method of claim 1, wherein the premixed photoluminescent composition further comprises one or more additives being at least one of an anti-leaching agent, a hydrophilic agent, a pH-control agent, a water-resistance agent, and a dust control agent.

12. The method of claim 11, wherein the premixed photoluminescent composition contains at most 2 wt % of the one or more additives with respect to the total weight of the premixed photoluminescent composition.

13. The method of claim 1, wherein the hardened water-resistant photoluminescent composition is a photoluminescent joint between pavers, and the method further comprises providing the pavers spaced-apart from one another so as to leave a space therebetween, and filling the space with the dry premixed photoluminescent composition to form the composition layer between pavers, prior to distributing water onto the composition layer.

14. The method of claim 13, wherein filing the space comprises sweeping or pushing the premixed photoluminescent composition into the space.

15. A photoluminescent joint between pavers or stones prepared according to the method of claim 13, the photoluminescent joint comprising the solid aggregates, the photoluminescent particulate component adapted to emit light when photoexcited, and the water-resistant binder matrix derived from activation of the water-activated binder by diffusion of water, wherein the water-activated binder comprises at least one of a natural or synthetic hydrocolloid, natural vegetal gum, polyacrylamide, psyllium husk powder, and polyvinyl alcohol partially hydrolysed.

16. The joint of claim 15, wherein the solid aggregates have a particle size ranging from 75 µm to 9.50 mm.

17. The joint of claim 15, wherein the solid aggregates comprise natural sand, manufactured sand, iron silicate, granite stone, quartz, sillimanite, crystalline silica, recycled glass, crumb rubber, mine tailings, crushed concrete, recycled plastics or a combination thereof.

18. The joint of claim 15, wherein the photoluminescent particulate component is made of particles of a powder, granules or glitter.

19. The joint of claim 15, wherein the photoluminescent particulate component is copper-activated zinc sulfide, calcium aluminate, calcium sulphite, strontium silicate, oxysulfide, strontium aluminate doped with at least one of Europium ions and dysprosium ions, or any combinations thereof.

20. A method of making a hardened water-resistant photoluminescent composition, the method comprising:
    providing a dry premixed photoluminescent composition, the premixed photoluminescent composition comprising solid aggregates, a photoluminescent particulate component adapted to emit light when photoexcited, a water-activated binder, and one or more additives being at least one of an anti-leaching agent, a hydrophilic agent, a pH-control agent, a water-resistance agent, and a dust control agent; and
    contacting the dry premixed photoluminescent composition with water to activate conversion of the water-activated binder, via diffusion of water, into a water-resistant binder matrix having a transparency allowing transmission of at least a portion of the light emitted by the photoluminescent particulate component, thereby forming the hardened water-resistant photoluminescent composition.

21. A dry premixed photoluminescent composition for forming joints between pavers or stones, the dry premixed photoluminescent composition comprising solid aggregates, a photoluminescent particulate component adapted to emit light when photoexcited, and a water-activated binder being made of particles having a particle size ranging from 75 µm to 9.50 mm and being activable upon contact with water to produce a hardened photoluminescent composition for forming the joints.

\* \* \* \* \*

UNITED STATES PATENT AND TRADEMARK OFFICE
CERTIFICATE OF CORRECTION

| | | |
|---|---|---|
| PATENT NO. | : 11,725,140 B2 | Page 1 of 1 |
| APPLICATION NO. | : 17/670870 | |
| DATED | : August 15, 2023 | |
| INVENTOR(S) | : Tutino et al. | |

It is certified that error appears in the above-identified patent and that said Letters Patent is hereby corrected as shown below:

In the Claims

Column 14, Line 53, Claim 14, please delete "filing" and insert --filling--

Signed and Sealed this
Tenth Day of October, 2023

Katherine Kelly Vidal
*Director of the United States Patent and Trademark Office*